US011356452B2

(12) United States Patent
Cohen et al.

(10) Patent No.: US 11,356,452 B2
(45) Date of Patent: Jun. 7, 2022

(54) SYSTEM, COMPUTER PROGRAM PRODUCT AND METHOD FOR RISK EVALUATION OF API LOGIN AND USE

(71) Applicant: Corelogic Solutions, LLC, Irvine, CA (US)

(72) Inventors: Matthew David Cohen, Irvine, CA (US); Albert Noble McElmon, III, Irvine, CA (US); Daniel W. Ray, Irvine, CA (US)

(73) Assignee: CORELOGIC SOLUTIONS, LLC, Irvine, CA (US)

( * ) Notice: Subject to any disclaimer, the term of this patent is extended or adjusted under 35 U.S.C. 154(b) by 240 days.

(21) Appl. No.: 16/559,289

(22) Filed: Sep. 3, 2019

(65) Prior Publication Data

US 2020/0076814 A1 Mar. 5, 2020

Related U.S. Application Data

(60) Provisional application No. 62/727,243, filed on Sep. 5, 2018.

(51) Int. Cl.
*G06F 15/16* (2006.01)
*H04L 9/40* (2022.01)
(52) U.S. Cl.
CPC ............ *H04L 63/102* (2013.01); *H04L 63/08* (2013.01); *H04L 63/0876* (2013.01); *H04L 63/107* (2013.01)
(58) Field of Classification Search
CPC ..... H04L 63/08; H04L 63/102; H04L 63/107; H04L 63/0876
See application file for complete search history.

(56) References Cited

U.S. PATENT DOCUMENTS

| | | | | |
|---|---|---|---|---|
| 9,197,600 B2* | 11/2015 | L'Heureux | ......... | H04L 63/1466 |
| 9,680,950 B1* | 6/2017 | Knecht | .................... | H04L 67/02 |
| 9,680,951 B1* | 6/2017 | Graham-Cumming | | ...................... H04L 67/10 |
| 10,437,898 B2* | 10/2019 | Temby | ................... | G06F 16/284 |
| 10,972,475 B1* | 4/2021 | Zaki | ........................ | H04L 9/3239 |
| 2007/0171921 A1* | 7/2007 | Wookey | ................ | G06F 9/5027 370/401 |
| 2007/0180448 A1* | 8/2007 | Low | ...................... | G06F 9/5055 718/1 |
| 2007/0180450 A1* | 8/2007 | Croft | ...................... | G06F 9/5077 718/1 |
| 2007/0186212 A1* | 8/2007 | Mazzaferri | ........... | G06F 3/1438 718/1 |

(Continued)

*Primary Examiner* — Khanh Q Dinh
(74) *Attorney, Agent, or Firm* — Xsensus LLP

(57) ABSTRACT

A method, system and computer program product assess risk of an unauthorized API login and mitigate damage from an unauthorized API login. The method includes collecting in a database license attributes of a user license, user profile attributes, and database content change attributes; receiving an API login request; comparing features of the API login request to at least one of the database license attributes, user profile attributes, and database content change attributes against a predetermined threshold; assessing a risk of the an unauthorized API login request based on a result of the comparison; and based on a level of the assessed risk, implemented protective action to mitigate harm that may result from an unauthorized user from accessing information or services from a computer system by way of an API.

20 Claims, 8 Drawing Sheets

(56) References Cited

U.S. PATENT DOCUMENTS

| | | | |
|---|---|---|---|
| 2007/0192329 A1* | 8/2007 | Croft | H04L 67/141 |
| 2007/0198656 A1* | 8/2007 | Mazzaferri | G06F 9/54 |
| | | | 709/218 |
| 2014/0245147 A1* | 8/2014 | Amidon | G06F 3/0482 |
| | | | 715/716 |
| 2016/0119330 A1* | 4/2016 | L'Heureux | H04L 67/2814 |
| | | | 726/7 |
| 2016/0185016 A1* | 6/2016 | Cangiano | B28B 1/14 |
| | | | 264/157 |
| 2016/0306950 A1* | 10/2016 | Schuman | H04N 21/41407 |
| 2017/0359349 A1* | 12/2017 | Knecht | H04L 61/1511 |

* cited by examiner

SYSTEM, COMPUTER PROGRAM PRODUCT AND METHOD FOR RISK EVALUATION OF API LOGIN AND USE

CROSS REFERENCE TO RELATED APPLICATION

The present application claims the benefit of the earlier filing date of U.S. provisional patent application Ser. No. 62/727,243, filed on Sep. 5, 2018, the entire contents of which being incorporated herein by reference in its entirety.

BACKGROUND

Technical Field

The present disclosure generally relates to the field of computer systems that involve remote devices to login to another computer system through an application programming interface (API).

Description of the Related Art

An example commercial product is APIGEE EDGE and it provides a platform for developing and managing API proxies. A proxy is a type of abstraction layer that serves as a front for a business that offers services over the WEB via backend service APIs. Businesses often offer services as a set of HTTP endpoints, and then client application ("app") developers make HTTP requests to these endpoints. Depending on the endpoint, the service might then return data, formatted as XML, back to the client app. Client apps that use these services can be standalone apps that run in a browser. The apps are often made by third-party app developers who make use of publicly available services.

As opposed to having the third-party app developers design apps that tie directly into a company's backend services, a company can employ an API proxy. The API proxy maps publicly available HTTP endpoints to the company's backend service. In turn, this also allows the API proxy to handle security and authorization tasks to protect the company's backend services.

The API proxy also allows the company to manage API security end-to-end, providing protection against hackers, bots, and other suspicious actors/behaviors. Use policies. to extend the inbuilt security layer in the API proxy, help to verify API keys at runtime, generate Auth tokens, implement JavaScriptobject notion (JSON) threat protection, and more.

FIG. 1 is a block diagram of a conventional system 100 that uses an API Use and Device Detection System 103 to monitor the use and login activity through an API 101. Moreover, as discussed above, the API (or API proxy) 101 provides an interface between backend client data and services which, in the present example, may be data offered on a content database 105. Client 102 will execute an app, or a program thereon that requests data from the content database 105. The requests are made in the form of message requests which identify the ID of the client 102 as well as its IP address. Once the request is made via the API 101, as long as the API use and device detection system 103 does not prohibit the request, content from the content database 105 will be conveyed through the API 101 to the client 102.

A process performed by API Use and Device Detection System 103 is shown in the flowchart of FIG. 2. The process begins in step 201 where the API Use and Device Detection System 103 stores API login attributes for the profiles of different users. These API login attributes $A_i$ include information regarding Device type, Pattern of activity use, Volume of data records, and geo-pattern. In step 203 the System 103 receives a new API login request with attributes $A_i$. The process then proceeds to step 205 where a query is made regarding whether each particular attribute is not within a threshold range $Th_i$. If the response to the query is affirmative, the process proceeds to step 207 where a flag is raised, and the login attempt is flag as potentially being an unauthorized login request. However, if the response to the query in step 205 is negative, the process returns to step 203 until another API login request is made.

SUMMARY

According to an aspect of the present disclosure, an additional layer of protection is provided to supplement the protection offered by a conventional API proxy so as to further protect against unauthorized API login and use of a company's backend services. For example, the risk evaluation of API login and use system and method according to the present disclosure offer an ability to watch for bogus device fingerprints, unusual activity bursts that suggest unauthorized access via a replicated license, anomalous behavior patterns, and/or suspicious geo-patterns. More particularly, the present disclosure offers the additional features and security not available or contemplated in existing systems.

While having the ability to watch for bogus device fingerprints is important, the company has specific knowledge of what kinds of servers and mobile devices are expected to use a specific API for the purpose licensed, and fingerprinting according to the present disclosure can be tuned to protect at that level.

While being able to monitor for activity bursts generically is important, the company that provides the backend services knows when a vendor has not yet downloaded a database for a replication license. In an example of a multiple listing service, MLS, the company providing the service has "side knowledge" of when a large volume of real estate listings has been updated, and in that case it could be expected that there is an activity burst from one or more licensees to replicate the changed listings. Adding a use monitoring level, such as a computer-based process, that is intelligent about what specific use to expect from the different types of API licenses (replication or real-time) will allow the system to avoid false positives that could cause issues for vendors and their customers.

The disclosed system also takes advantage of the side knowledge of "typical behavior patterns" so anomalous behavior patterns that may apply to APIs can be detected. Moreover, because the service company knows both the details of the purposes for which data is licensed and activity inside the licensor database, the software-based processes run by the company at the API proxy can be smarter about what is anomalous. For example, the service company will know that a data license is for replication and know which records the API user should be requesting to synchronize their replicated database. This is a different usage pattern than that expected from requests from an API proxying mobile app and is also distinct from the usage pattern of direct mobile API use.

The disclosed system is also able to watch for suspicious geo-patterns. Unlike existing products and API security processes, the disclosed system has awareness of license type and restrictions pertinent to geography. For example, the company will have side knowledge of whether a license is tied to a specific server and/or disaster recovery center, development shop, or whether to expect traffic on an API from mobile devices that may be used from locations traditionally considered "risky". Moreover, this allows the system to more quickly and accurately determine that geographic use of the API is suspicious and thus should possibly be disallowed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
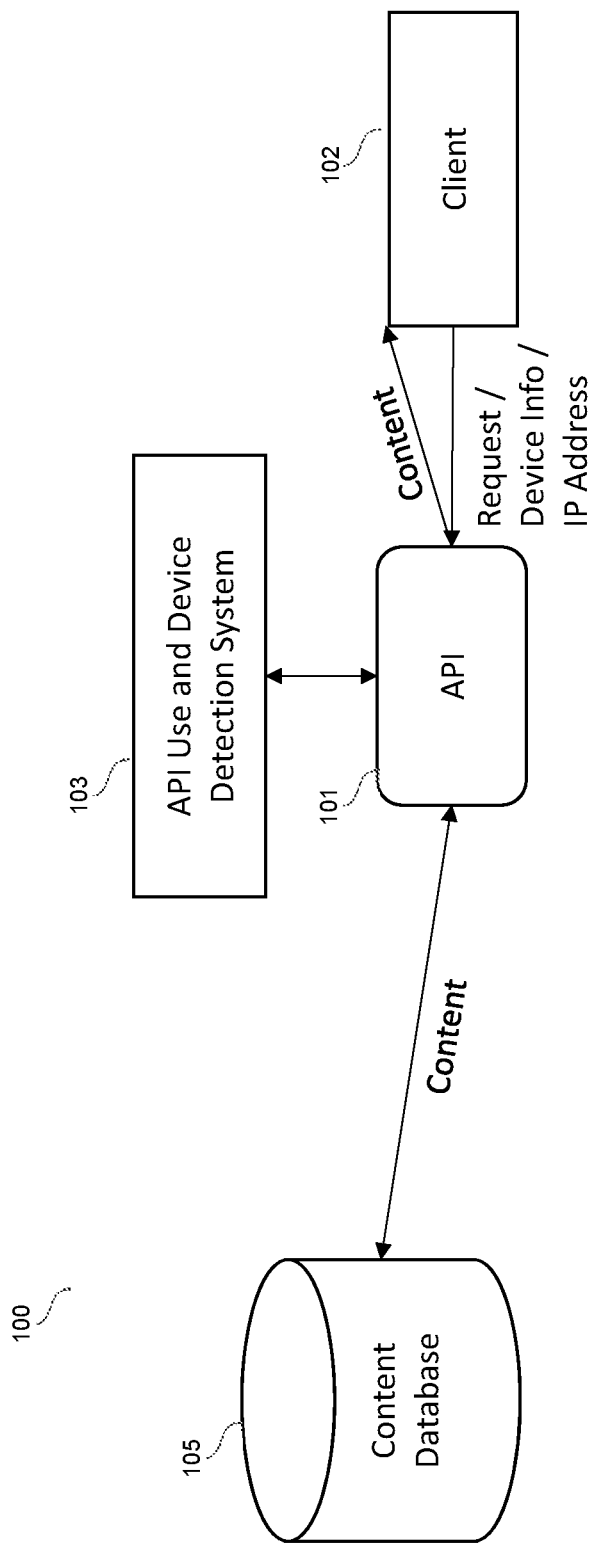
FIG. 1 is a block diagram of a conventional API protection system.
Figure 2:
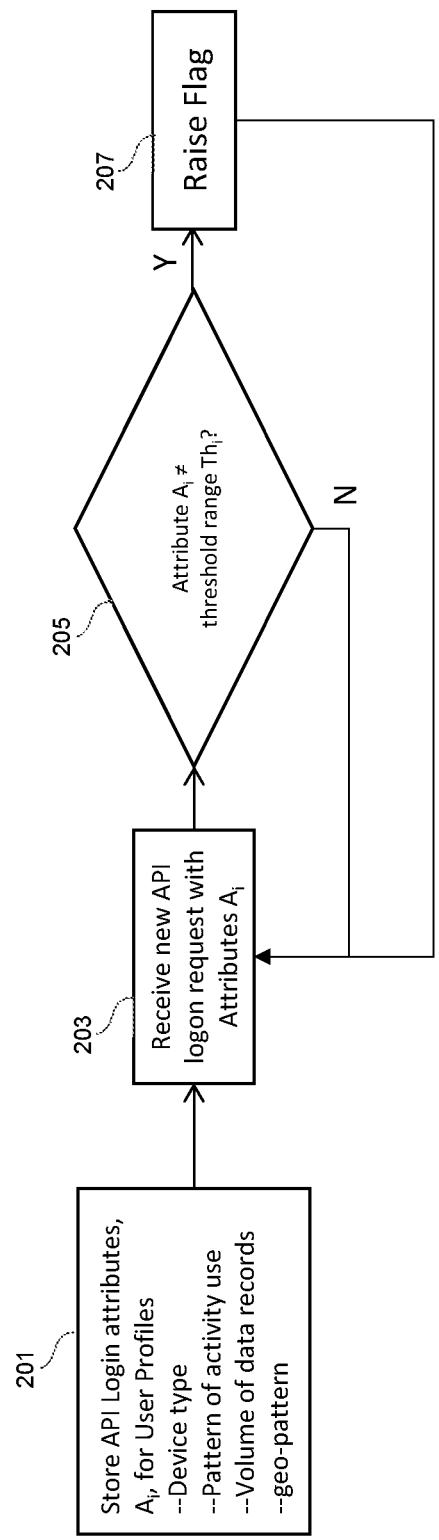
FIG. 2 is a flowchart of a conventional API protection process flow.
Figure 3:
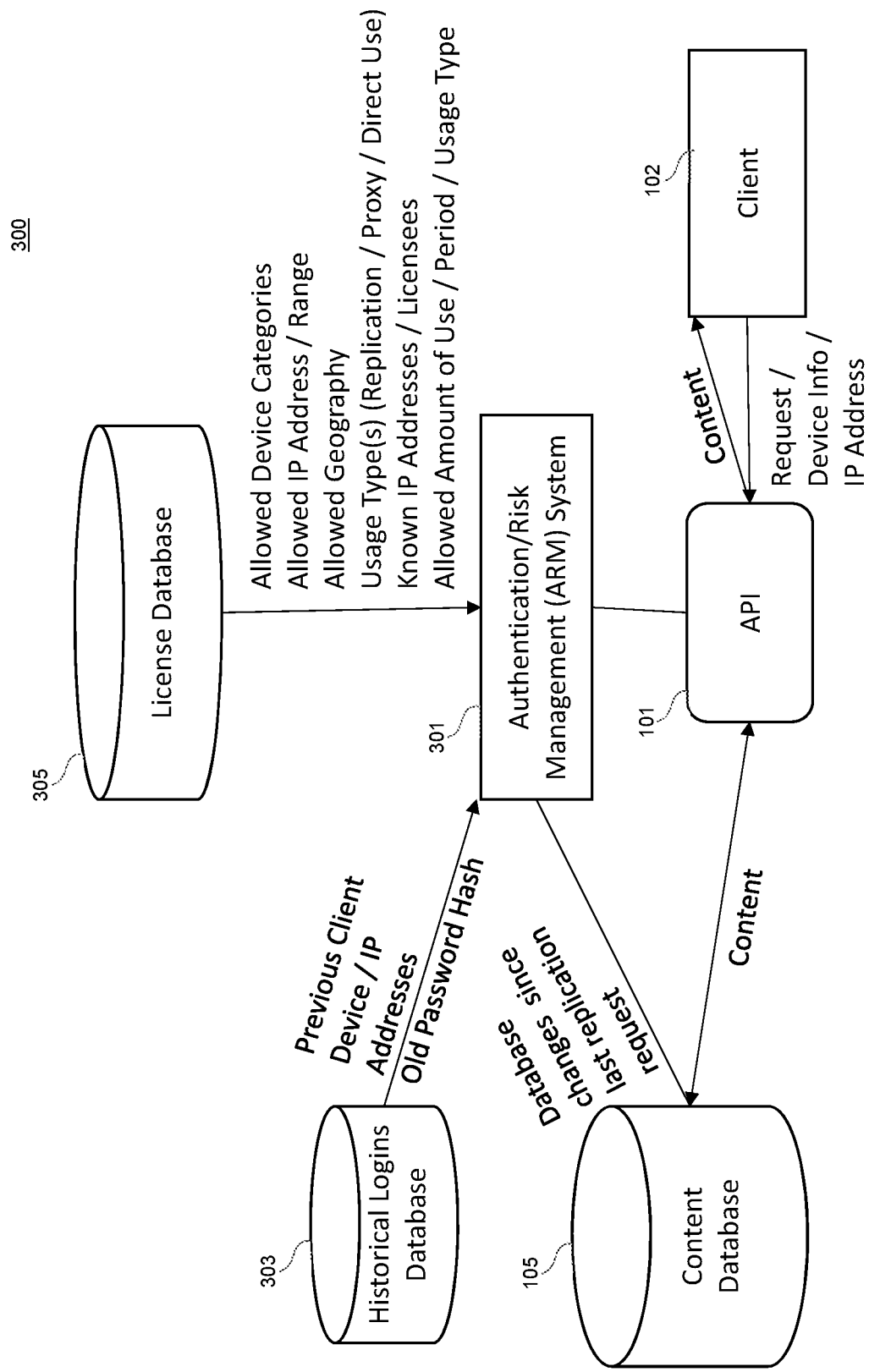
FIG. 3 is a block diagram of a supplemental API login system according to the present disclosure.

A block diagram of a supplemental system for risk evaluation of API Login and Use (REALU) 300 is shown in FIG. 3. Unlike the conventional API Use and Device Detection System 103 (FIG. 1), the REALU 300 includes an Authentication/Risk Management (ARM) system 301 that provides an additional layer of protection to an API or API proxy being compromised and a process for providing rapid remediation once the potential compromise has been detected. The ARM 301 is a programed computer (e.g., circuitry configured by software) that interfaces locally or remotely to the API host or proxy 101. However, unlike the conventional API Use and Device Detection System 103, the ARM 301 also is connected to the content database 105, a historical logins database 303 and a license database 305.

When the client 102 makes a request for content or services to the content database 105 (or backend services) via the API 101, the ARM 301 monitors the request, and compares the request with accumulated "side information" to help mitigate the risk of an unauthorized client gaining access to the content and/or backend services. One aspect of the "side information" is the available access to the license terms for the particular "legitimate" client who has contracted for the data or services. For example, in the context of a multiple listing service (MLS) the client may have a license to replicate the database, or download updates since the last replication. This would be a license term that is saved in the license database 305. Other information contained in the license database 305 would be (1) allowed device categories (e.g., mobile devices, servers, etc. that can access the contents or services, (2) allowed IP addresses or ranges of addresses, (3) allowed geography (e.g., licensed for access from the US only, or perhaps a particular state), (4) usage types (e.g., replication/proxy/direct use), (5) known IP addresses associated with particular licensees, and (6) allowed amount of usage/period/usage type. Having access to this license information allows the ARM 301 to compare the login/request information from the client 102 and identify if there are any inconsistencies between the request of a legitimate user from vis-à-vis the request of a unauthorized user.

Similar to the "side information" from the license database 305, the ARM 301 has access to additional side information from the historical logins database 303. This information includes previous client device fingerprints, and IP addresses, and perhaps old passwords (or hashes). This historical information can be used by the ARM 301 in a similar way to the information from the database 305 by allowing the ARM 301 to look for inconsistencies in requests made by the client 102.

Figure 4:
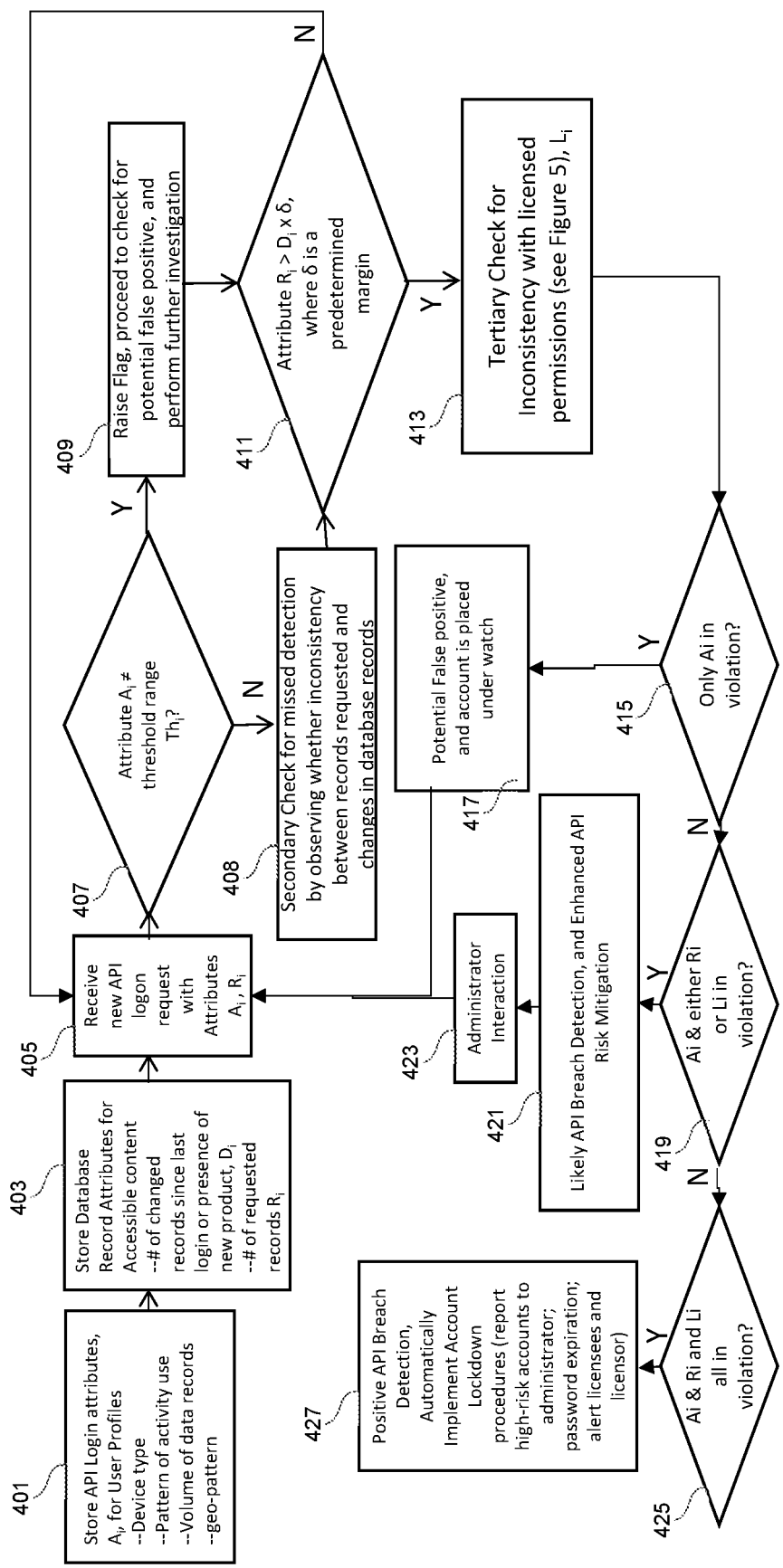
FIG. 4 is a flowchart of a process according to the present disclosure that leverages knowledge of changes to backend database records.

FIG. 4 is a flowchart of a process of leveraging side-information known to the service provider to improve the likelihood of detecting breaches in API login activity and mitigating the risk of damage as result of any such breach. The process begins in step 401 where API login attributes, $A_i$, are stored in memory, and then in step S403, database record attributes are stored, such as the number of changed records since the user's last login, or since the presentation of a new product offering, or number of requested records $R_i$. In step 405, a new API login request is received with attributes $A_i$ and $R_i$. Given the data access rights allotted to a licensee as per their license, the volume of data rights authorized for access via the API may be monitored for overuse, and thus as an indicator of potential violation of licensing terms and/or shared API login credentials, and/or compromised login credentials. For example, for a replication license, an amount of records the user may have recently accessed (e.g., within an hour, day, or week), suggests the same API client would not need to access the same records in a short period of time and a licensee should only need to access to replicate the database. Moreover, the maximum number of records anticipated to be accessed in subsequent queries may be anticipated based on how many records have already been accessed recently (e.g., a day, a week, or a month). If the volume of present records requested does not match expectations, it is an indication of potential overuse, and thus suggestive of a compromise of API login credentials, sharing of the API login credentials and/or a license violation. For example, if a user has replication rights, and has just recently (e.g., within an hour, day, or week) replicated an entirety of the database, or a particular section for which they are authorized, then another request for wholesale replication within a set time frame (e.g., a day or week) would trigger an indication that access to the database has been overused. In turn, this signals a warning that the API login credentials may have been compromised and the API breached by an unlicensed user posing as a licensed user.

The process proceeds to step 407 where a query is made regarding whether attributes $A_i$ in the request are equivalent to a threshold range $Th_i$. If the response to the query is negative, then there is a secondary check in step 408 for whether there is an inconsistency between the requested records and changes in the database, and then process proceeds to step 411. On the other hand, if the response to the query in step 407 is affirmative, the process proceeds to step 409, where a flag is set indicating the incongruity and the process proceeds to check for potential false positives in a further investigation as part of the query in step 411.

In step 411, login request attribute $R_i$ is compared with $D_j$, a new product attribute, biased by a margin, $\delta$. If the attribute $R_i$ is not greater than $D_j \times \delta$ (where "$\times$" is a multiplication operator), there is not a need for a further check for a compromised login process and the process returns to step 405. However, if the response to the query in step 411 is affirmative, the process proceeds to step 413, where a tertiary check is made for inconsistencies with licensed permissions $L_i$ (see FIG. 5), and subsequently the process proceeds to a series of queries, the first of which is in step 415.

In step 415, a query is made regarding whether only the attributes for user profiles $A_i$ are in violation, and if so the process proceeds to step 417 where a potential false positive is detected and the administrator is alerted so the Login account can be put under watch for further suspicious activity, and subsequently the process returns to step 405. However, if the response to query is negative, it means that there are more violations, and so a subsequent check is performed in step 419 for whether $A_i$ and either $R_i$ or $L_i$ are in violation. If so, the process identifies that there is likely an API breach detected and Enhanced API risk mitigation tactics are implemented in step 421, before an administrator is automatically messaged about the likely breach. Subsequently the process proceeds to step 405.

However, if the inquiry in step 419 is negative, if means that all three indicators, $A_i$, $R_i$ and $L_i$ are in violation and is it highly likely that there is an API breach that has been detected. In response, the process proceeds to step 427, where the account is automatically placed in lockdown, where more aggressive actions are taken, including reporting to the administrator of the existence of a high-risk account, mandatory password expiration, as well as possibly alerting licensees and the licensor.

Figure 5:
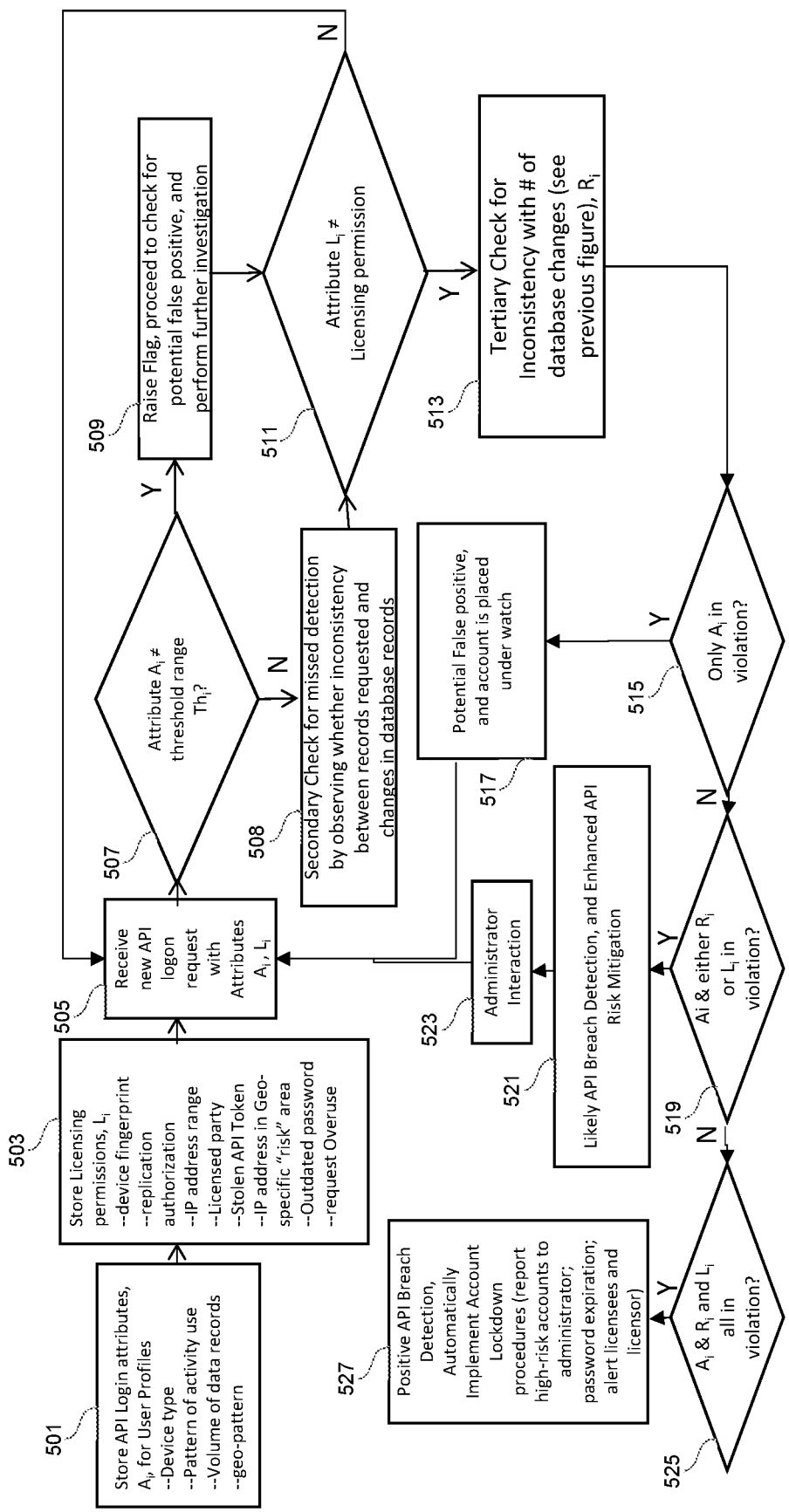
FIG. 5 is another flowchart of a process according to the present disclosure that leverages knowledge of device-type inconsistencies with an API license.

FIG. 5 is similar to FIG. 4 although the priority of indicators $L_i$ (priority is in process of FIG. 5) and $R_i$ (priority is in process of FIG. 4) reversed. Thus, steps 501, 507, 509, 515, 517, 508, 519, 521, 523, 525 and 527 are consistent with corresponding steps in FIG. 4. However, 503 is different in that the licensing permission attributes/indicators $L_i$ are stored, and include device fingerprint, replication authorization, IP address range, licensed party, stolen API token, IP address in Geo-specific "risk" area, outdated password, and request overuse.

The query of step 511 is similar to that of step 411, although the licensing permission attributes $L_i$ are compared with the stored licensing terms associated with a particular user's account.

Figure 6:
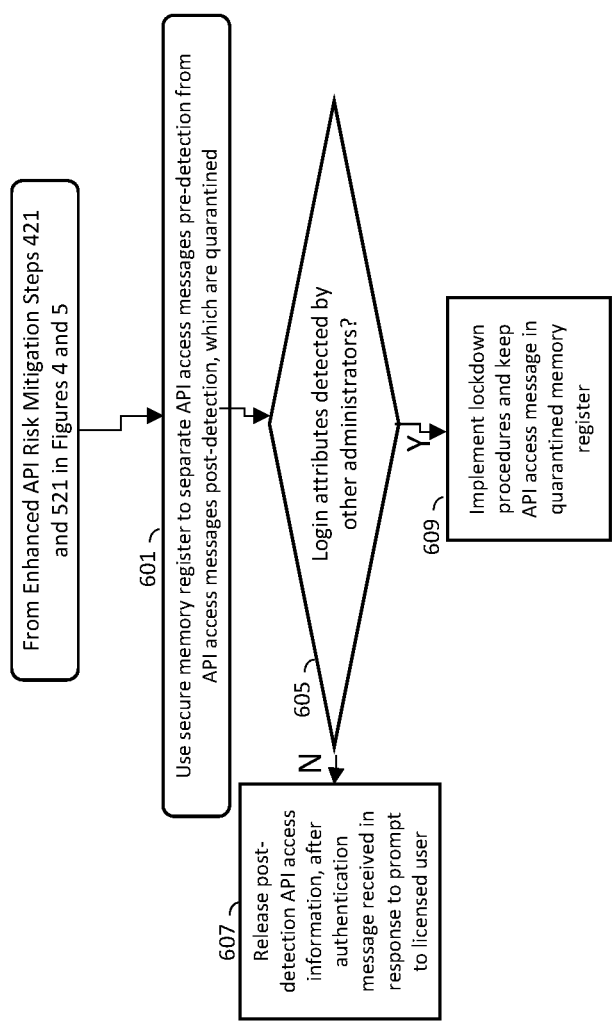
FIG. 6 is a flowchart of a supplemental process that employs a secure memory according to the present disclosure.

FIG. 6 is a flowchart performed by a secure memory hardware based system that is employed to assist in mitigating the effects of an account that may have been compromised. The process begins in either step 421 or 521 of FIGS. 4 and 5 respectively. The process the proceeds to step 601 where a regular accessible memory is used to separately store API access messages collected during a pre-breach detection phase from API access messages received in post-detection breach phase, which are stored in the secure memory. The secure memory includes a device specific preamble that is assigned to the message and only memory request messages that refer to that specific preamble have access to the secure memory.

The process proceeds to step 605 where a query is made regarding whether the login attributes are detected by other administrators as part of a collaborative network. If there is no evidence of other breaches from other administered systems, the process proceeds to step 607 where the post-detection API access messages are released. The release is made in response to a prompted reply message received from a licensed user from a verified account. However, if the response to the query in step 609 is affirmative, a lockdown process is implemented and the post-detection API access messages are kept in the secure memory for subsequent forensics.

Further discussion regarding remediation steps is provided in the following discussion. According to the teachings of the present disclosure, there are conditions that will cause remediation actions to be taken by the computer system based on the severity of the issue discovered. Users of the system may modify remediation steps as desired, and what level of risk triggers them.

Regarding use of the computer-based monitoring system for monitoring API login activity, there is more than one way that the computer-based monitoring system can be used (described herein as "use profiles") and there will be different rule applicability and weighting based on how the account is being used. Use Profiles include: Server—Replication; Server—Real-time Request Proxying; and Mobile App Direct Access.

A server will generally have a fixed IP address range, while a mobile app may have many IP addresses over time and so use rules need to accommodate those different devices that may use the system. For replication, it is prudent to have recorded how many items in a database have changed since the last request from that user, and not allow many more items to be requested without tagging an account for overuse, while for a real-time request proxy, the server is asking for records on behalf of many client web/mobile apps—and usage rules will be very different.

Client application fingerprinting may also be used to detect suspicious, unlicensed use of the API, and is different from using user agent strings. The general notion is that many client applications exhibit predictable patterns when performing their operations. Clients in this space would indicate libRets, Phrets, and other packaged or custom API client libraries, etc. Although the client application may actually self-identify by sending a field that contains an identification, the activity of the client application itself exhibits usage traits that provide de-facto identification based on established activity patterns including (1) timing between requests, (2) order of requests, and (3) the parallelism at which the requests are performed.

The system first observes and stores one or more of these attributes for a given client application, and then calculates stores a statistical distribution of the observed attributes (e.g., 80% range, 90%, 95%, 99%) for a particular application. Then, when the same alleged client application uses the API but exhibits a behavior that is inconsistent with the observed statistical range, a warning is generated to identify a risk when a set of credentials is being used by multiple client application fingerprints. This approach can also indicate that a user has started using a new client or it can indicate that multiple users are sharing credentials. This analysis can also be used to identify problem clients so feedback can be provided to the creators of the application so they can optimize their platform.

In more detail, this approach may be used to fingerprint a particular client, or an alleged particular client, which is actually an unauthorized user of the client's API credentials. In this context, a "client" refers to software used to access the database from a remote location. Clients in this example would indicate libRets, Phrets, and other packaged or custom API client libraries, etc. The client libraries can be identified by the way the client libraries perform a query, user agent strings, and general patterns. For example, a client library may issue a login request and then 10 search requests in a certain time pattern. A client may also issue a login request with EVERY search. The present system monitors the sequence of events and calculates a confidence score to assess a confidence that the querying device is actually using a specific client. The confidence score is determined by observing a number of comment events for the client (e.g., number of search requests within 1 minute of a login event), and calculating a cumulative distribution function (or probability density function) of the observed events, which establishes the probability or confidence that a present event is within x % of the expected activity of the client. A user agent can also be used with a confidence score to classify a client, but user agent strings are easily changed and generally not reliable. Once the system makes a determination what client device is being using, the system can use the confidence score as a metric to assess a likelihood (and detection of) licensed use, or unlicensed use. A user typically uses one type of client application to do all of their work, and so if multiple clients are being used, it is a strong indicator that they are running multiple platforms with the same credential, and thus is likely an unlicensed user.

A combined confidence score may be determined by providing a weighted average of the confidence score for each attribute (see discussion above). Alternatively, a determination of licensed or unlicensed use may be made by combining a weighted average of (1) a sequence of the queries they run, (2) Search/Login/Media access, (3) a speed at which the queries are run; and (4) a user agent string. In a particular example, all four factors are equally weighted, with each factor being set to 1 if the observed attribute deviate by more than 20% from the observed pattern, and 0 if the observed attributed deviates less than 20% from the observed pattern for that attribute. The threshold of 20% may be varied up or down depending on the sensitivity sought. For example, if the sequence of queries deviates by only 10% from the generally observed sequence (e.g., center 80% of the probability density function for the attribute), then factor (1) is 0. Under the condition that all of the factors are evenly weighted, then compromised API credentials are detected if the weighted average exceeds a threshold, e.g. 0.5. The threshold may be set lower than 0.5 for a more sensitive detection and higher than 0.5 for a less sensitive detection. Complementary to the fingerprinting approached described above, a clustering algorithm like that described in U.S. patent application Ser. No. 14/322,593, the entire contents of which is incorporated herein by reference, may be used as well. Moreover, in one embodiment credentials authorized for direct mobile application to access to listings are used to establish patterns of login behavior to identify the source of the requesting computer(s)/application(s). The process may be used for identifying a confidence score for a single login attribute, or a combined confidence score for more than one. For example, the clustering algorithm identifies a feature or group of features of login credentials as a data point S in Euclidean space. Then the algorithm includes steps of (1) Finding the distances from S to each known pattern, where the best distance to a pattern is defined as the closest point; (2). If there exists no retrieved distance below a threshold X, create S as its own cluster; (3). Else, take the closest cluster C (which corresponds to pattern P), (3a). If the distance is more than R, S is called a relative of C and assigned a confidence of "Medium" to belong to P, (3b). Else, if the size of the cluster is "small enough" (relative to a threshold), P is integrated into the cluster and returned a "High confidence of it belonging to P, (3c). Else return a "High" confidence for it belonging to P.

In this way, the algorithm may be used to identify a combined confidence score for subsequent processing like that discussed above.

Example rules for these three use profiles are provided in the table below, along with an associated assessment of confidence for the specified condition. Numeric values may be associated with each risk assessment so a weighted combination may be made to determine the severity of the breach, when the weighted combination is compared to a threshold. For example, a high risk may be assigned a numeric value of 1, while medium is 0.5, and low is 0.

| Rule | Risk - Server Replication | Risk - Server - Real-time Request Proxying | Risk - Mobile App Direct Access |
| --- | --- | --- | --- |
| 1. Credential used out of licensed IP range. Analyze IP address/range and associate it with name of licensee (broker or vendor). Limitation: This rule does not provide whether the credentials have been given to an unauthorized user. Potential for False positive: short term spike in risk score due to data center migration period or use of a DR center. Could be addressed by allowing vendors to manually register >1 IP ranges for a period . . . | Medium | Medium | N/A |
| 2. Credential used in multiple (unknown) IP ranges. This rule differs from Rule (#1) above in that this rule looks for requests coming from multiple IP ranges, going back and forth between them (e.g. range A - range B - range C - range B - range A . . .) False Positive: same as Rule #1 | High | High | N/A |
| 3. Credential used by known unlicensed party. "This [back end broker system] credential is tied to a broker and not a | High | High | N/A |

-continued

| Rule | Risk - Server Replication | Risk - Server - Real-time Request Proxying | Risk - Mobile App Direct Access |
|---|---|---|---|
|     3-way agreement with a vendor (or vendors) but it arises from an IP address tied to a vendor-associated IP range already stored in the computer system. | | | |
| 4.  Stolen API token. Ensure login credential use and token uses come from the same IP address. | High | High | N/A or Low |
| 5.  Risky IP location. Ensure API is not used from locations deemed "risky". | | | |
|     a.  Out of countries (US/Canada/customer country) for replicated database use (not direct mobile API use) | High | High | Low |
|     b.  DHCP allocated addresses for replicated database use (not direct mobile API use) False positive: non-server development environment - should be disallowed. | Medium | Medium | N/A |
|     c.  Non-data center IP address for high security data replicated database use (not direct mobile API use) False positive: non-server development environment - should be disallowed. | Medium | Medium | N/A |
|     d.  Non-cellular-allocated IP address for mobile API use False positive: non-mobile development environment. | N/A | N/A | High |
| 6.  Use of Old Password. If a password change has been initiated on the computer system, and the new password has been used, then the old password is used again from another IP address; this scenario is an indication that a shared password has been used. | High | High | High |
| 7.  Device fingerprinting. Evaluate HTTP headers and ensure no change between logins or at least a logical upgrade progression. White-list of a change would be needed in the event of a major vendor platform change or the rule could watch for changes back and forth between two or more platforms. | Low/Medium | Low/Medium | High if non-mobile device used |
| 8.  Overuse can either be a symptom of credential sharing or just inefficient use of the API server, and neither is good. | | | |
|     a.  MLSs may want to set minimum periods for servers to check for new listings (e.g. 1, 2, 3, 5, 10, or 15 minutes) and the computer system could either disallow more frequent requests or report on them. | TBD - if functional restriction this is N/A. Otherwise Medium | N/A | N/A |
|     b.  Once a server has obtained a full copy of the database, it should be requesting about the same number of listings as any other licensee's server, with only minor variation. | Medium | N/A | N/A |
|     c.  Overuse over periods of time (daily, weekly, monthly) compared with peers | Overuse daily - Low Overuse weekly - Medium Overuse monthly - High | Overuse daily - Low Overuse weekly - Medium Overuse monthly - High | TBD based on financial arrangement by usage? |

Remediation steps include the following:
Highlight high-risk accounts in a user interface Dashboard and Reports;
Send weekly emails to Licensors highlighting high-risk accounts;
Send daily alerts sent to Administrator and Licensor email or text message (depending on user preferences). Only send if there are accounts currently evaluating as a high security risk or with overuse;
Send immediate alerts sent to Administrator and Licensor email or text message for new high-risk accounts that meet a high threshold (depending on user preferences);
Force a password to expire within [e.g., 30] days. Email Licensee (cc: Licensor, Administrator). Licensor/Administrator can choose text message option for this notification;
Disable the licensor account, revoke the authentication token. Email Licensee (cc: Licensor, Administrator). Licensor/Administrator can choose text message option for this notification;
Examples of E-Mail messages that may be sent in response to various observations are provided below
Activity Summary
EITHER:
There are no accounts currently evaluating as a high security risk or with overuse.
OR:
The following accounts will be forced to change their passwords due to security risk or overuse: [if any]
[list of accounts—date] [order by soonest to latest]
The following accounts have been automatically deactivated due to security risk or overuse: [if any]
[list of accounts] [order alphabetically]
The following accounts have been evaluated as having a high security risk: [if any]
[list of accounts passing threshold—risk score] [order by risk score descending]
The following accounts have been evaluated as overusing the Trestle resource: [if any]
[list of accounts passing threshold—risk score] [order by risk score descending]
AND:
Please log into your dashboard for more information and, if you have any questions, please reach out to us.
[contact information]
Daily Alert Text Message
Security: [as applicable] [#] force pwd change. [#] auto deactivated. [#] high risk. [#] accounts with overuse. Log in for more detail.
Immediate Alert—Email
Subject: API Login Alert.
[as applicable]
The following accounts have newly triggered a security alert:
[list of accounts]
The following accounts have newly triggered an overuse alert:
[list of accounts]
Please log into your dashboard for more information and, if you have any questions, please reach out to us.
[contact information]
Immediate Alert—Text Message
Subject: Security Alert. [as applicable] Security Alert on Account(s): [list]. Overuse alert on account(s): [list]
Licensee Email—Security or Overuse Issue—Change Password (cc: Licensor, Administrator)
Subject: Security—Change Password
Please log in to your API Proxy account "[account name]" and change your password by [date].
If you do not do so, the account will be disabled after that date.
If you have any questions, please reach out to us.
[contact information]
Licensee Email—Account Disabled (cc: Licensor, Administrator)
Subject: Security—Account Disabled
It appears that there is a security or overuse condition that caused Trestle to disable your account.
If you have any questions, please reach out to us.
[contact information]

For database replication use, database updates will occur on a regular period (e.g. every five minutes). If an observed cadence (periodic activity over time) of updates or changes is observed, that change in cadence may indicate a requirement for further evaluation. For example, if an entity has a replication license, they may initially experience a single large retrieval of data, or perhaps a burst of a series of retrievals to populate their local database. After that, they may only look for updates on a periodic basis, such as 5 minutes or every 10 minutes, or every hour, or every day. However, based on the inventors' experience, the API client software, which may or may not be integrated into an application, tends to exhibit a predictable update pattern and then reliably follow that pattern into the future. The system analyzes the cadence of access and compares current cadence to past cadence and reports on any changes to an established pattern, ignoring periods where the API server or client may be unavailable and there is no activity. An example of this is provided below in reference to FIG. 7 and cadence of database retrieval requests.

While the example below relates to number of records retrieved, another attribute that is monitored for potential overuse is "unlock" actions. Moreover, a licensed user may have license rights to a full replication of the database (or a portion of the database). At other times, the licensed user may have limited rights to only partial replication or only updated records. Thus, monitoring of excessive, or multiple requests/actions within a certain time period (e.g., a day, or a week) for unlocking a full replication of the database can be used as an indicator that the replication request is overused, and there is a license violation. A similar cadence analysis is performed for database updates.

In summary, "unlock" replication actions of an API client can be counted and scored for excessive full-replication queries.

Figure 7:
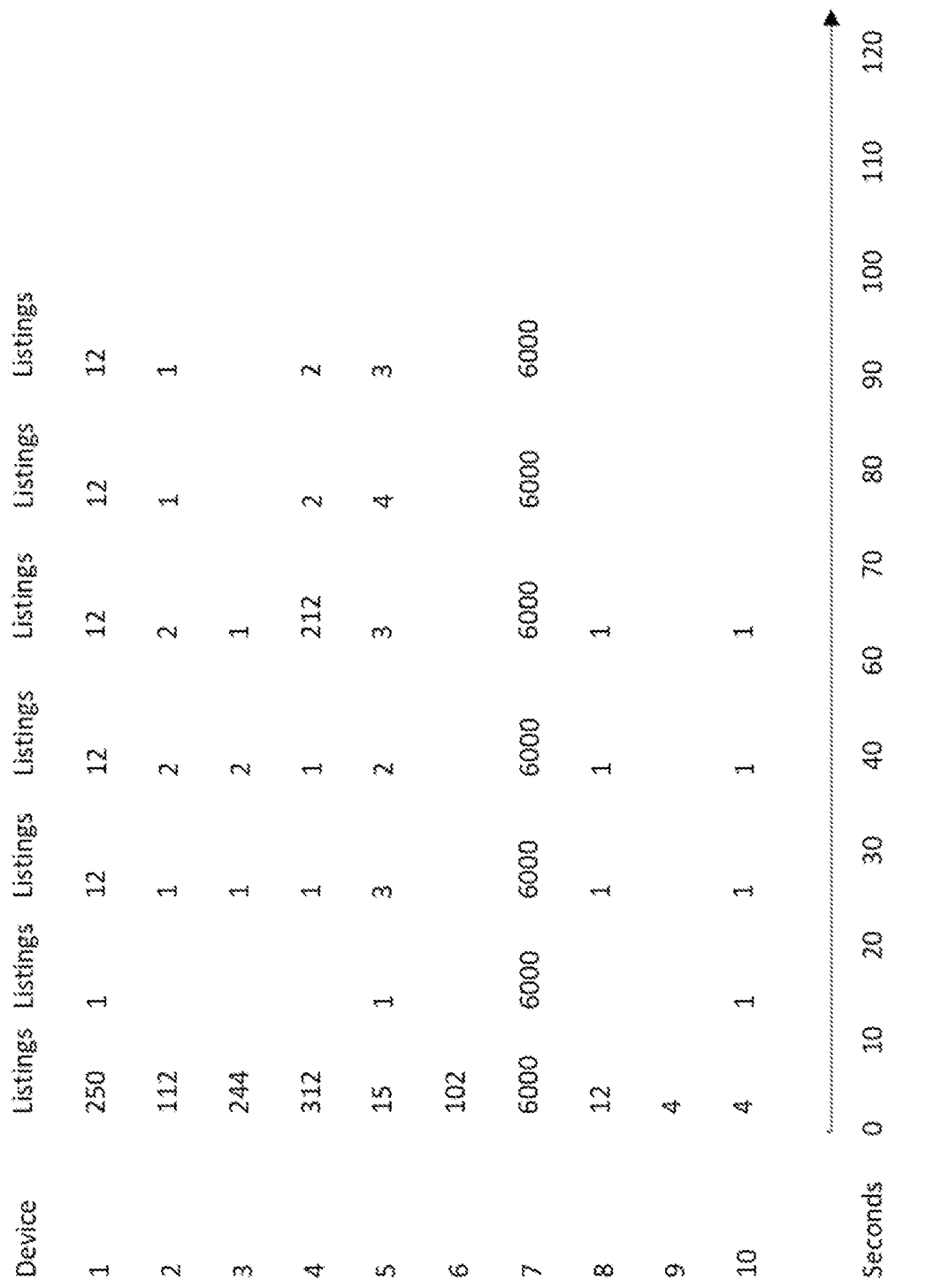
FIG. 7 is a table of a number of requests for real-estate listings made at different times via human request or automated computer requests such as via a bot.

FIG. 7 is a chart of exemplary retrieval requests made by 10 different devices at various times from a database of real estate listings (where each list is a description of attributes of a real property). It is presumed that each of the devices has a license to retrieve data regarding listings to which they are authorized to access, consistent with the terms of the license. While the respective devices in this example are mobile applications executed on a remote device that access the database via the API, it should be understood that the disclosure is not limited to mobile devices, but may include servers, site licenses for a plurality of computing resources, or even groups of devices connected via one or more networks. As is typical for a license to a mobile device, a user of the device may perform a search of records held in the database, and the number of records searched/retrieved at any given time may be in a range from 0 to 250, or some other number typical of an end-user search using a specific application. After the initial query/retrieval at time 0, a user may then typically scroll through pages of listings with more information which, for the example application, is averaging two to five API calls per second. This pattern is seen in FIG. 7 for Devices 2-3, 5-6, and 8-10. However, starting at 30 seconds, the more rapid retrieval requests for device 1 is suggestive of a bot taking over for a human. Also, between 60 seconds and 70 seconds, Device 4 shows a higher than normal number of API calls (212). However, that is not atypical of a typical pattern of user activity because the user may have requested a set of data (perhaps related to a neighborhood in a real estate application, or some other subset of the database) after reviewing initial records, after deciding to filter the results differently, or perhaps after identifying that the some of the records held in device's cache is out of date. On the other hand, device 7 breaks with a typical pattern as it obtains an outlier number of listings (6000) at each of a number of short time intervals and an outlier number of consecutive API calls at different times. Moreover, device 7 makes 6000 API call request for listings as an initial request, which is higher than the expected 0 to 250 requests, and also makes persistently high requests, in the form of 6,000 record requests every ten seconds for several minutes. This pattern of activity is not typical of a licensee who presumably already has a cache of previous records, and thus would not need to make 6,000 requests every 10 seconds over a two minute duration. Detection of anomalous behavior may be performed with computer-based algorithms, such as a Turkey algorithm that establishes a Tukey fence, or other similar approach. Using an algorithm of this type permits the automated detection of statistical outliers representing anomalous behavior of a licensee, which in turn is an indication of potential compromise of a user's logon credentials by an unlicensed user. Indications of potential compromise of account credentials include an inconsistent number of records obtained regularly over time that is not supported by past action of a device, at least not in terms of obtaining a larger than normal set of records per analysis time period, an outlier length of the session for a particular device over time, or the number of smaller records returned between larger record searches.

The methods and systems described herein may be implemented using computer programming or engineering techniques including computer software, firmware, hardware or any combination or subset thereof, wherein the technical effects may include at least one of: a) providing a secure method for identifying and securing a system that uses and API or and API proxy for providing access to backend services, and b) providing a rapid, automated process for responding to any detected unauthorized use of the backend services.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 7 is a functional block diagram illustrating a networked system 800 of one or more networked computers and servers. In an embodiment, the hardware and software environment illustrated in FIG. 7 may provide an exemplary platform for implementation of the software and/or methods according to the present disclosure.

Figure 8:
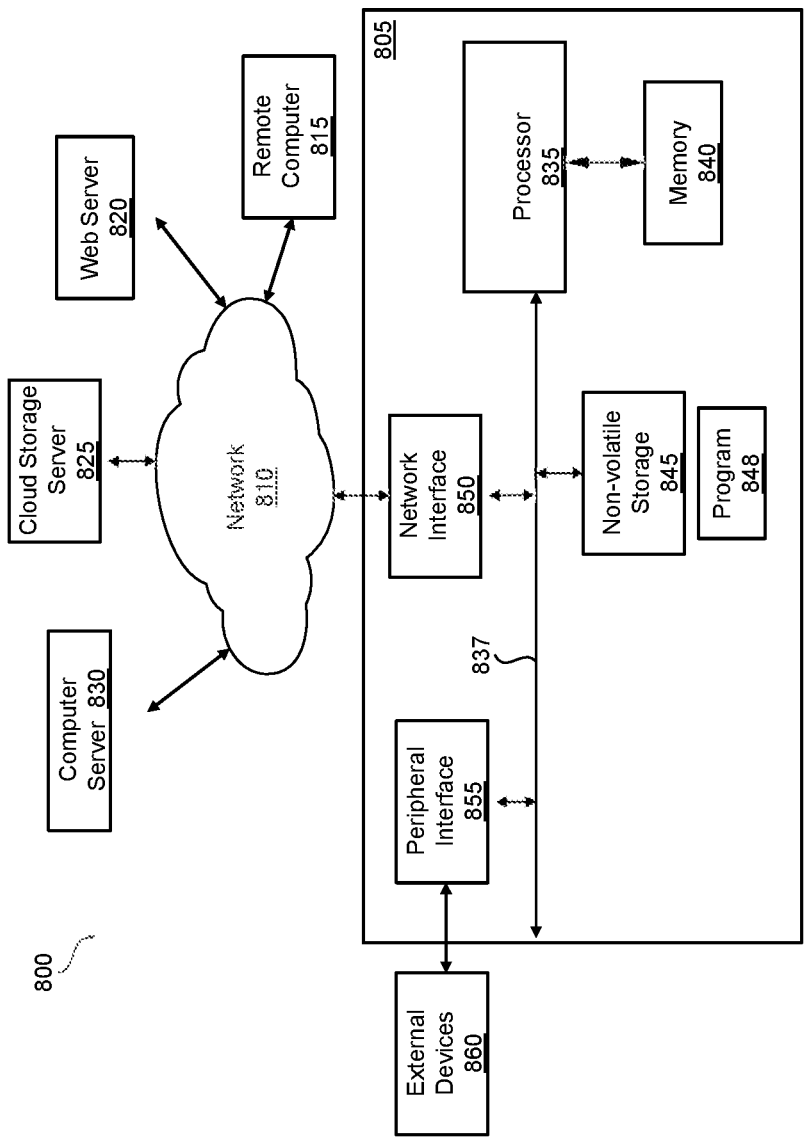
FIG. 8 is a block diagram of a computer platform used to host the processes described herein.

Referring to FIG. 8, a networked system 800 may include, but is not limited to, computer 805, network 810, remote computer 815, web server 820, cloud storage server 825 and compute server 830. In some embodiments, multiple instances of one or more of the functional blocks illustrated in FIG. 8 may be employed.

The functional blocks illustrated within computer 805 are provided only to establish exemplary functionality and are not intended to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, and peripheral interface 855. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media.

Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Examiner and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A method to mitigate data from being compromised via an unauthorized API login event, comprising: storing in a database license attributes of a user license, user profile attributes, historical login attributes, and database content change attributes; receiving an API login request; comparing features of the API login request to at least one of the database license attributes, user profile attributes, historical login attributes, and database content change attributes against a predetermined threshold;
    detecting whether the API login request is an unauthorized API login request based on a result of the comparison; and in response to the API login request being detected as an unauthorized API login request, limiting unauthorized retrieval of data from the database wherein the historical login attributes include, for a particular licensed device that makes the API login request, a client application fingerprint, the client application fingerprint includes at least one of a historical timing between API request activity, a historical order of requests, and
    a combination of API request activity and order of requests, and the detecting includes calculating a historical distribution of at least one attribute of the client application fingerprint, comparing the API login request to the historical distribution to determine whether attributes of the API login request are more different than a predetermined amount from a standard statistical behavior of client application footprint, and in response to a determination that the API login request is more different than the predetermined amount, generating an alert that the API login request requires mitigation activity to avoid a potential compromise of data in the database to an unauthorized device.

2. The method of claim 1, wherein in response to the determination that the API login request is more different than the predetermined amount, performing at least one additional step of determining that the detecting resulted in a false positive and placing an account associated with login credentials for the API login request on watch; determining that an API breach likely occurred and generating an alter message to database administrators to implement enhanced API risk mitigation steps; and locking down the account.

3. The method of claim 1, wherein the historical login attributes include, for a particular licensed device that is making the API login request, a cadence of past data requests performed via API activity.

4. The method of claim 3, wherein the cadence includes a recognized pattern of requested volumes over time.

5. A method to mitigate data from being compromised via an unauthorized API login event, comprising:
    storing in a database license attributes of a user license, user profile attributes, historical login attributes, and database content change attributes; receiving an API login request; comparing features of the API login request to at least one of the database license attributes, user profile attributes, historical login attributes, and database content change attributes against a predetermined threshold; detecting whether the API login request is an unauthorized API login request based on a result of the comparison; and
    in response to the API login request being detected as an unauthorized API login request, limiting unauthorized retrieval of data from the database, wherein the historical login attributes include, for a particular licensed device that is making the API login request, a cadence of past data requests performed via API activity, the cadence includes a recognized pattern of requested volumes over time, the detecting includes calculating a historical distribution of the cadence, comparing the API login request to the historical distribution to determine whether the API login request is more different than a predetermined amount from a standard statistical behavior of cadence, and in response to a determination that the API login request is more different than the predetermined amount, generating an alert that the API login request requires mitigation activity to avoid a potential compromise of data in the database to an unauthorized device.

6. The method of claim 5, wherein in response to the determination that the API login request is more different than the predetermined amount, performing at least one additional step of determining that the detecting resulted in a false positive and placing an account associated with login credentials for the API login request on watch; determining that an API breach likely occurred and generating an alter message to database administrators to implement enhanced API risk mitigation steps; and locking down the account.

7. The method of claim 1, wherein the database license attributes include, for a particular licensed device that is making the API login request, a volume of requests performed via API activity.

8. The method of claim 7, wherein the detecting includes comparing the number of requests in the API login request to a threshold, and in response to a determination that the API login request is more different than the threshold, generating an alert that the API login request requires mitigation activity to avoid a potential compromise of data in the database to an unauthorized device.

9. The method of claim 8, wherein the limiting includes at least one of determining that the detecting resulted in a false positive and placing an account associated with login credentials for the API login request on watch; determining that an API breach likely occurred and generating an alert message to database administrators to implement enhanced API risk mitigation steps; and locking down the account.

10. A method to mitigate data from being compromised via an unauthorized API login event, comprising: storing in a database license attributes of a user license, user profile attributes, historical login attributes, and database content change attributes;

receiving an API login request; comparing features of the API login request to at least one of the database license attributes, user profile attributes, historical login attributes, and database content change attributes against a predetermined threshold; detecting whether the API login request is an unauthorized API login request based on a result of the comparison; and in response to the API login request being detected as an unauthorized API login request, limiting unauthorized retrieval of data from the database, wherein the comparing includes comparing a number of replication requests within a predetermined period of time, the detecting includes counting a number of database unlock events triggered by API login requests, and the detecting includes detecting that the API login request is the unauthorized API login request in response to the number being exceeded within a predetermined time period or above a predetermined amount.

11. The method of claim 1, wherein the attributes of the user license include at least one of a licensed device category, and a licensed IP address range.

12. The method of claim 1, wherein the attributes of the user license include a licensed geography of a device that makes the API login request.

13. The method of claim 1, wherein the attributes of the user license include a usage type for a device that makes the API login request, the usage type being one of a replication usage, proxy usage, or direct usage.

14. The method of claim 1, wherein the attributes of the user license include a restriction on at least one of a number of data records requested, or a period of time between data requests.

15. The method of claim 1, wherein the historical login attributes include for a particular licensed device that makes the API login request include an identification of the particular licensed device in the API login request.

16. The method of claim 5, wherein the attributes of the user license include at least one of a licensed device category, and a licensed IP address range.

17. The method of claim 5, wherein the attributes of the user license include a licensed geography of a device that makes the API login request.

18. The method of claim 5, wherein the attributes of the user license include a usage type for a device that makes the API login request, the usage type being one of a replication usage, proxy usage, or direct usage.

19. The method of claim 5, wherein the attributes of the user license include a restriction on at least one of a number of data records requested, or a period of time between data requests.

20. The method of claim 5, wherein the historical login attributes include for a particular licensed device that makes the API login request include an identification of the particular licensed device in the API login request.

\* \* \* \* \*